United States Patent [19]
Shieh

[11] Patent Number: 5,492,206
[45] Date of Patent: Feb. 20, 1996

[54] MOTORCYCLE DISK BRAKE LOCK

[76] Inventor: Jin-Ren Shieh, No. 178, Shih Chia Rd., Taichung, Taiwan

[21] Appl. No.: 403,487

[22] Filed: Mar. 14, 1995

[51] Int. Cl.⁶ ............................. B60R 25/00; E05B 67/36
[52] U.S. Cl. .................. 188/265; 70/233; 70/33; 70/34
[58] Field of Search ........................... 188/31, 60, 69, 188/265; 70/33, 34, 233

[56] References Cited

U.S. PATENT DOCUMENTS

| | | | |
|---|---|---|---|
| 5,265,451 | 11/1993 | Phifer | 70/233 |
| 5,365,758 | 11/1994 | Shieh | 70/233 |
| 5,379,618 | 1/1995 | Shieh | 70/233 |
| 5,388,436 | 2/1995 | Shieh | 70/233 |

FOREIGN PATENT DOCUMENTS 472564  11/1968  Switzerland ..................... 70/33

Primary Examiner—Robert J. Oberleitner
Assistant Examiner—Chris Schwartz
Attorney, Agent, or Firm—Browdy and Neimark

[57] ABSTRACT

A motorcycle disk brake lock comprises a main body including a retaiing slot to fit over the brake disk and a lock body which fits into a first recess. A lock bolt, part of the lock body, extends in a through hole, across the slot, into a second recess. The lock bolt has a stop slot near the end protruding through the slot into the main body across from the first recess. A stop member is inserted into a third recess that intercepts the second recess. The stop member is capable of moving back and forth to engage and disengage the stop slot. The lock bolt is held securely in the second recess when the stop member engages the stop slot. To release the lock body, the lock body is rotated by key to remove the stop slot from the opening of the third recess and force the stop member out of engagement. The device may also include an additional stop slot and stop member on the side of the main body on the opposite side of the slot.

5 Claims, 2 Drawing Sheets 5,492,206

MOTORCYCLE DISK BRAKE LOCK

FIELD OF THE INVENTION

The present invention relates generally to a motorcycle lock, and more particularly to a burglaryproof disk brake lock for motorcycle.

BACKGROUND OF THE INVENTION

As shown in FIG. 1, a motorcycle disk brake lock 1 of the present invention comprises a U-shaped main body 2 and a lock body 3. The main body 2 has a retaining slot 4 dimensioned to receive therein a motorcycle disk brake and provided in the inner wall of the left side thereof with a recess 5. The lock body 3 has a lock bolt 6 capable of moving back and forth over the retaining slot 4. In operation, the motorcycle disk brake is placed in the retaining slot 4 before moving the lock bolt 6 to pass the heat radiating hole of the disk brake to remain transversely over the retaining slot 4 in such a manner that the end of the lock bolt 6 is inserted into the recess 5 so as to secure the lock 1 to the brake disk. As the lock 1 is rotated along with the brake disk, the lock 1 is obstructed by the two shock absorbers mounted respectively on both ends of the wheel axle, so as to prevent the wheel from turning.

Such a prior art disk brake lock 1 as described above is defective in design in that the lock bolt 6 can be caused easily by an external force to become disengaged with the recess 5 by means of a tool, which is inserted into the retaining slot 4 to force one leg of the U-shaped main body 2 to move aside, as shown in FIG. 2.

SUMMARY OF THE INVENTION

It is therefore the primary objective of the present invention to provide a motorcycle disk brake lock with a U-shaped main body which can not be tampered with easily by an unauthorized person.

The foregoing objective of the present invention is attained by a motorcycle disk brake lock comprising a main body and a lock body. The main body is provided with a retaining slot, a first recess, a second recess, a third recess, and a stop member capable of moving back and forth to engage a stop slot of the lock body. When the lock bolt of the lock body is inserted into the second recess, the lock bolt is held securely in the second recess by means of the stop member.

DETAILED DESCRIPTION OF THE INVENTION

Figure 1:
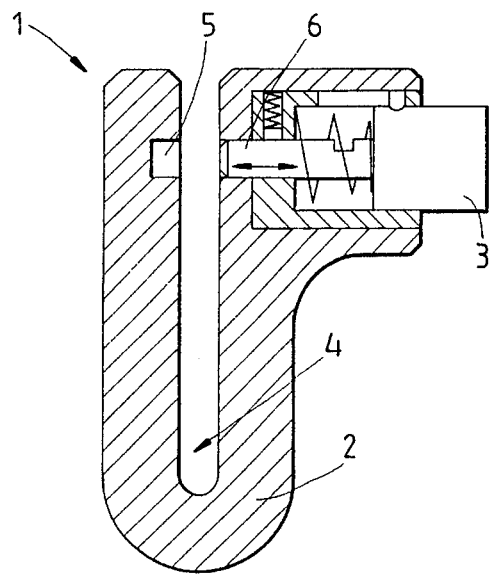
FIG. 1 shows a sectional view of a motorcycle disk brake lock of the prior art.
Figure 2:
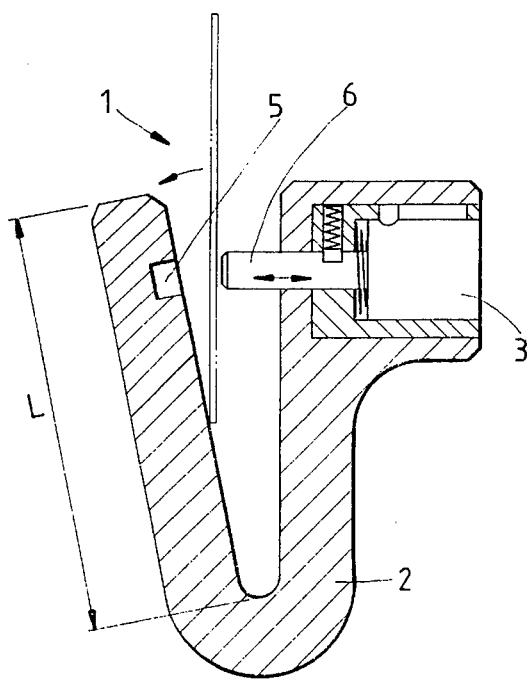
FIG. 2 is a sectional view illustrating the tampering of the motorcycle disk brake lock of the prior art.
Figure 3:
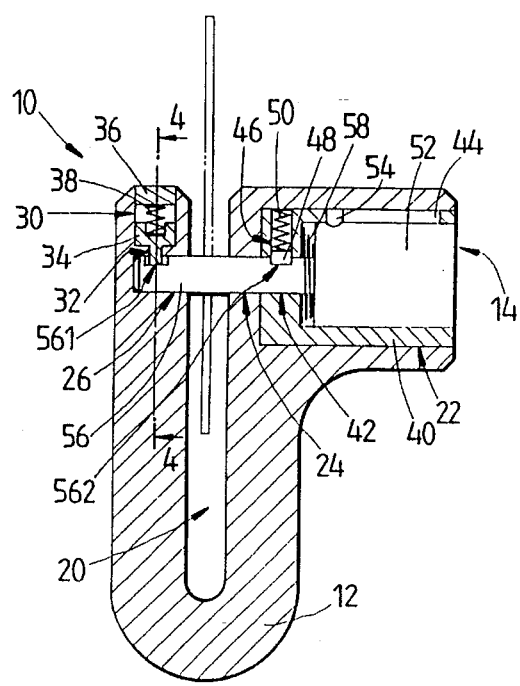
FIG. 3 shows a sectional view of a first preferred embodiment of the present invention.
Figure 4:
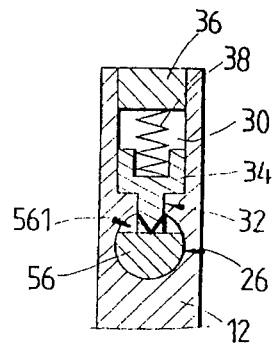
FIG. 4 shows a sectional view of a portion taken along the line 4—4 as shown in FIG. 3.

As shown in FIGS. 3 and 4, a motorcycle disk brake lock 10 of the present invention comprises a main body 12 and a lock body 14.

The main body 12 is made integrally and is provided with a retaining slot 20 extending uprightly, a first recess 22 extending horizontally, a first through hole 24 connecting the first recess 22 with the retaining slot 20 and having an inner diameter smaller than that of the first recess 22, a second recess 26 located in the inner wall of the retaining slot 20, a third recess 30 located on the left side of the retaining slot 20 and extending uprightly, a second through hole 32 connecting the third recess 30 with the second recess 26 and having an inner diameter smaller than that of the third recess 30, a first stop member 34 disposed slidably in the third recess 30 such that one end of the first stop member 34 extends through the second through hole 32 into the second recess 26, a plug 36 engageable with the top end of the third recess 30, and a first spring 38 located between the first stop member 34 and the plug 36 and intended to exert a downward pressure on the first stop member 34.

The lock body 14 has a sleeve 40 which is secured to the first recess 22 and is provided at the bottom thereof with a third through hole 42 coaxial with and corresponding in the inner diameter to the first through hole 24. The sleeve 40 is further provided with a guide slot 44 extending along the axis of the sleeve 40, and with a fourth through hole 46 extending vertically and communicating with the third through hole 42. The sleeve 40 is still further provided with a second stop member 48 disposed slidably in the third through hole 46, and with a second spring 50 disposed in the fourth through hole 46 and between the inner wall of the first recess 22 and the second stop member 48 for exerting a downward pressure on the second stop member 48. The sleeve 40 further comprises a lock core 52 disposed slidably in the first recess 22, a slide block 54 fastened to the lock core 52 and engageable with the guide slot 44, a lock bolt 56 mounted on the lock core 52, and a third spring 58 fitted over the lock bolt 56 such that the third spring 58 is located between the bottom of the sleeve 40 and the lock core 52 for exerting a rightward pressure on the lock core 52. It must be noted here that the lock bolt 56 can be actuated by a key (not shown in the drawings) to rotate axially such that the outer end of the lock bolt 56 is extended horizontally via the second and the third through holes 32 and 42 into the retaining slot 20. The lock bolt 56 is provided with a first stop slot 561 and a second stop slot 562 engageable with the second stop member 48.

In operation, a motorcycle disk brake (shown by the dotted lines in the drawings) is first placed in the retaining slot 20 of the lock 10 of the present invention. Thereafter, the lock core 52 is pressed to actuate the lock bolt 56 to move leftwards so as to cause the inner end of the lock bolt 56 to move into the second recess 26 via the heat radiating hole of the motorcycle disk brake. In the meantime, the first stop member 34 and the second stop member 48 are engaged respectively with the first stop slot 561 and the second stop slot 562 so that the lock bolt 56 is held securely. As a result, it is rather difficult for an unauthorized person to tamper with the main body 12 via the upper end of the retaining slot 20.

The disk brake lock 10 of the present invention can be unlocked by inserting a key into the lock core 52 to actuate the lock bolt 56 to turn for a predetermined angle, thereby causing the first and the second stop members 34 and 48 to move upwards to disengage respectively the first and the second stop slots 561 and 562. In the meantime, the lock core 52 is urged by the third spring 58 to actuate the lock bolt 56 to move outwards so as to become disengaged with the heat radiating hole.

Figure 5:
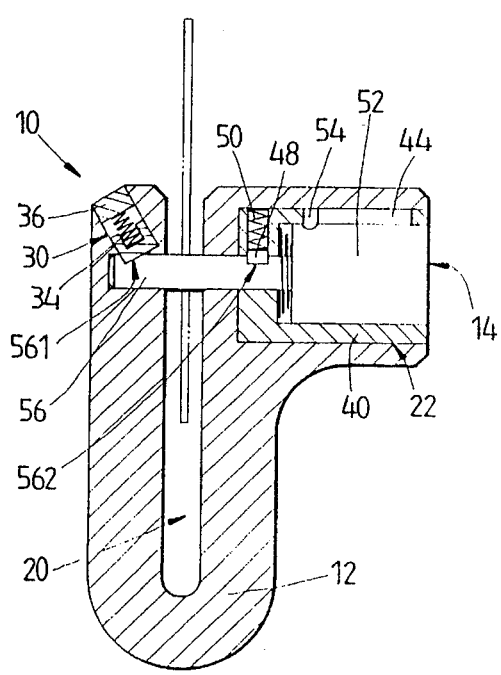
FIG. 5 shows a sectional view of a second preferred embodiment of the present invention.

As shown in FIG. 5, the third recess 30 of the disk brake lock 10 of the present invention may be so disposed that the third recess 30 is extended obliquely from the upper left corner to the lower right corner of the main body 12, and that the axis of the third recess 30 and the axis of the second recess 26 form an angle smaller than 90 degrees, and further that the portion of the inner end of the third recess 26 is in communication with the second recess 26. As a result, the portion of the lower end of the first stop member 34 can be caused to move into the second recess 26 to engage the first stop slot 561 without the need of the second through hole 32.

What is claimed is:

1. A motorcycle disk brake lock comprising:

a main body provided with a retaining slot dimensioned to receive therein a motorcycle disk brake, said retaining slot defined by an inner wall of the slot and an outer wall of the slot facing thereto, a first recess located at one side edge of said main body, a first through hole via which said retaining slot is in communication with said first recess, and a second recess located in the inner wall of said retaining slot such that said second recess is opposite in location to said first through hole;

a single lock body disposed in said first recess and provided with a lock core and a lock bolt mounted on said lock core such that said lock bolt is capable of sliding horizontally along with said lock core in said first recess;

wherein said main body is provided with a third recess in communication with said second recess via a second through hole, said third recess is provided with a first stop member capable of sliding in the direction of an axis of said third recess, said first stop member iS urged by a first biasing means such that one end of said first stop member extends into said second recess via said second through hole; and wherein said lock bolt has an outer end which is received in said second recess and is provided with a first stop slot engageable with said first stop member and disengageable by rotation of said lock bolt.

2. The motorcycle disk brake lock as defined in claim 1, wherein said third recess has an axis which forms with an axis of said second recess an angle smaller than 90 degrees; and wherein said third recess has an inner end which is in communication with said second recess.

3. The motorcycle disk brake lock as defined in claim 1, wherein said third recess extends inwards from a periphery of said main body; wherein said third recess has an outer end provided with a plug fastened thereto; wherein said first biasing means is located between said plug and said first stop member; and wherein said second through hole has an inner diameter smaller than an inner diameter of said third recess.

4. A motorcycle disk brake lock comprising:

a main body provided with a retaining slot dimensioned to receive therein a motorcycle disk brake, said retaining slot defined by an inner wall of the slot and an outer wall of the slot facing thereto, a first recess located at one side edge of said main body, a first through hole via which said retaining slot is in communication with said first recess, and a second recess located in the inner wall of said retaining slot such that said second recess is opposite in location to said first through hole;

a single lock body disposed in said first recess and provided with a lock core and a lock bolt mounted on said lock core such that said lock bolt is capable of sliding horizontally along with said lock core in said first recess;

wherein said main body is provided with a third recess in communication with said second recess via a second through hole, said third recess is provided with a first stop member capable of sliding in the direction of an axis of said third recess, said first stop member is urged by a first biasing means such that one end of said first stop member extends into said second recess via said second through hole; and wherein said lock bolt has an outer end which is received in said second recess and is provided with a first stop slot engageable with said first stop member and disengageable by rotation of said lock bolt; and wherein said first recess is provided therein with a sleeve which is inserted thereinto and is provided therein with a lock core, said sleeve further comprising;

a guide slot located at a periphery thereof and extending in the direction of an axis of said sleeve;

a third through hole via which a bottom of said sleeve is in communication with said first through hole;

a fourth through hole via which said third through hole is in communication with a periphery of said sleeve, said fourth through hole containing therein a second biasing means and a second stop member;

wherein said lock core is provided peripherally with a slide block capable of sliding back and forth in said guide slot of said sleeve; and wherein said lock bolt is provided with a second stop slot engageable with said second stop member.

5. The motorcycle disk brake lock as defined in claim 4, wherein said lock bolt is fitted into a third biasing means which has two ends urging respectively an inner side of said lock core and said bottom of said sleeve.

* * * * *